Feb. 3, 1953 — H. A. KOSKI — 2,627,137
ANIMAL TRAP
Filed Jan. 22, 1951
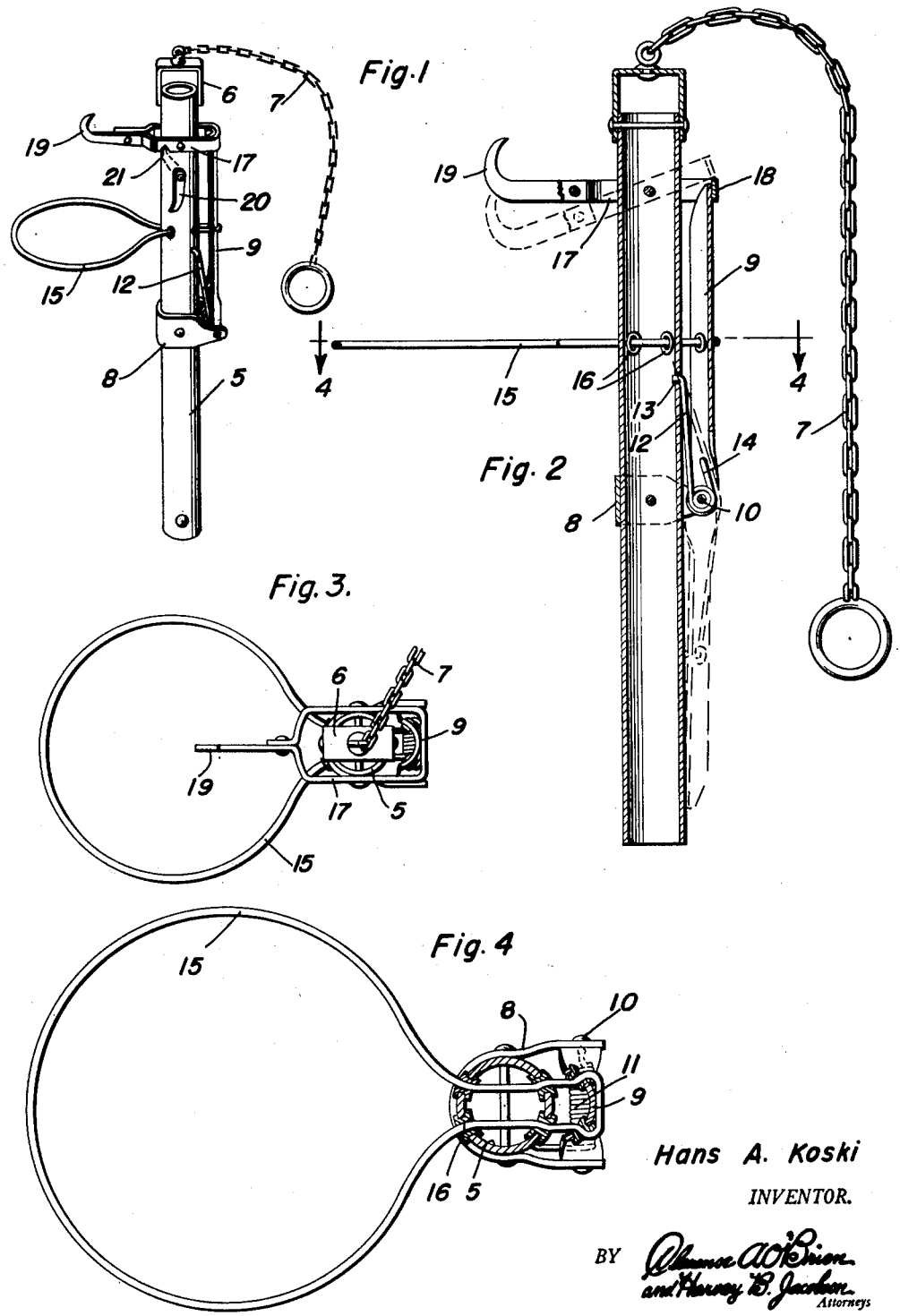
Hans A. Koski
INVENTOR.

Patented Feb. 3, 1953

2,627,137

UNITED STATES PATENT OFFICE 2,627,137

ANIMAL TRAP

Hans A. Koski, Wolf Creek, Mont.

Application January 22, 1951, Serial No. 207,150

3 Claims. (Cl. 43—87)

The present invention relates to new and useful improvements in animal traps and more particularly to a snare trap.

An important object of the invention is to provide a snare trap by means of which the neck of an animal is caught in a noose to prevent damage to the fur of the animal.

Another object is to provide means for suspending the trap from the branch of a tree whereby the trapped animal is held above the ground to prevent damage to the fur by other animals.

A further object is to provide a device of this character of simple and practical construction which is efficient and reliable in operation, relatively inexpensive to manufacture and otherwise well adapted for the purposes for which the same is intended.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view;

Figure 2 is an enlarged vertical sectional view;

Figure 3 is a top plan view; and

Figure 4 is an enlarged transverse sectional view taken on a line 4—4 of Figure 2.

Referring now to the drawing in detail, wherein for the purpose of illustration I have disclosed a preferred embodiment of my invention, the numeral 5 designates a metal tube having a hanger 6 at one end and to which a chain 7 is attached for suspending the tube in a perpendicular position from the limb of a tree or other suitable overhead support.

A U-shaped bracket 8 is attached to the sides of tube 5 with the ends of the bracket projecting rearwardly from the tube and to which one end of a lever 9 is pivoted for vertical swinging movement by means of a pin 10 supported by the rear ends of the bracket. A coil spring 11 is placed on pin 10 with one end 12 of the spring anchored in a hole 13 in the tube and the other end 14 of the spring engaged with the lever to swing the lever downwardly.

A wire noose 15 is slidable in openings 16 in the tube and is attached to lever 9 at a point above its pivoted end to constrict the noose when the lever swings downwardly.

A combined bait holder and trip 17 is pivoted to tube 5 for vertical swinging movement and is formed with a loop 18 at the rear end of the trip in which the free end of lever 9 is engaged to hold the lever in its raised position. A bait holding hook 19 is formed at the front end of trip 17 and is positioned above noose 15. A safety catch 20 is pivoted on one side of tube 5 under trip 17 to engage a notch 21 in the front portion of the trip and hold the loop 18 downwardly and engaged behind lever 9.

In the operation of the device the tube 5 is supported by chain 7 in a perpendicular position and when setting the trap noose 15 is pulled forwardly and lever 9 swung upwardly and held by loop 18 at the rear end of trip 17, as shown by full lines in Figure 2.

Safety catch 20 is swung upwardly to engage and hold the trip from accidentally releasing the lever.

After the trip is set the safety catch 20 is released and an animal in attempting to reach the bait on bait hook 19 will stretch its head upwardly into noose 15 and upon pulling downwardly on the front end of the trip will release the lever 9 which will then swing downwardly by spring 11 as shown by dotted lines in Figure 2 and pull the noose 15 tightly about the neck of the animal. The animal will be held upwardly above the ground and its fur thus protected from damage by small animals.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An animal trap comprising an elongated body, a U-shaped support member secured intermediate the ends of said body, a pivot pin secured to said support member, a lever having one end pivoted on said pivot pin, a coil spring mounted on said pin having an arm engaging said body and another arm biasing said lever away from said body, an animal actuated trip member pivoted adjacent one end of said body and engaging the other end of said lever, said lever extending parallel to said body, and a wire snare slidably supported by the body for movement transversely thereof and including a contractible loop portion, said snare having its ends secured to said lever intermediate the ends thereof, said snare being constricted by release of the lever by the trip member.

2. An animal trap comprising an elongated body, a U-shaped support member secured intermediate the ends of said body, a pivot pin secured to said support member, a lever having one end pivoted on said pivot pin, a coil spring mounted on said pin having an arm engaging said body and another arm biasing said lever away from said body, an animal actuated trip member pivoted adjacent one end of said body and engaging the other end of said lever, said lever extending parallel to said body, and a wire snare slidably supported by the body for movement transversely thereof and including a contractible loop portion, said snare having its ends secured to said lever intermediate the ends thereof, said snare being constricted by release of the lever by the trip member, and said snare being journaled through said body and being contracted thereby as the lever is biased away from said body.

3. An animal trap adapted to be suspended above the ground including an elongated body, a suspension attachment on the upper end of said body, a U-shaped support member secured intermediate the ends of said body, a pivot pin secured to said support member, a lever having one end pivoted on said pivot pin, a coil spring mounted on said pivot pin having an arm engaging said body and another arm biasing said lever away from said body, an animal actuated trip member pivoted adjacent one end of said body and engaging the other end of said lever, said lever extending parallel to said body, and a wire snare slidably supported by the body for movement transversely thereof and including a contractible loop portion, said snare having its ends secured to said lever intermediate the ends thereof, said snare being constricted by release of the lever by the trip member.

HANS A. KOSKI.

REFERENCES CITED

The following references are of record in the file of this patent:

UNITED STATES PATENTS

| Number | Name | Date |
|---|---|---|
| 371,086 | McGary | Oct. 4, 1887 |
| 1,372,561 | Scott | Mar. 22, 1921 |